United States Patent
Harrigan et al.

[11] Patent Number: 5,861,977
[45] Date of Patent: Jan. 19, 1999

[54] DUAL FORMAT DUAL RESOLUTION SCANNER WITH OFF-AXIS BEAMS

[75] Inventors: Michael E. Harrigan, Webster; Badhri Narayan, Rochester, both of N.Y.

[73] Assignee: Eastman Kodak Company, Rochester, N.Y.

[21] Appl. No.: 806,303

[22] Filed: Feb. 26, 1997

[51] Int. Cl.$^6$ .................................................. G02B 26/08
[52] U.S. Cl. .......................... 359/203; 359/201; 359/216; 359/217; 347/261
[58] Field of Search .................................. 359/201–203, 359/209–212, 216–219; 347/243, 260–261; 358/296, 302, 474, 481

[56] References Cited

U.S. PATENT DOCUMENTS

| | | |
|---|---|---|
| 3,944,323 | 3/1976 | Starkweather . |
| 3,973,826 | 8/1976 | Lobb ........................................ 359/203 |
| 4,040,096 | 8/1977 | Starkweather ........................... 358/302 |
| 4,171,917 | 10/1979 | Pirlet ........................................ 359/201 |
| 4,247,160 | 1/1981 | Brueggemann . |
| 4,578,689 | 3/1986 | Spencer et al. .......................... 346/160 |
| 4,651,169 | 3/1987 | Muka ........................................ 346/108 |
| 4,651,170 | 3/1987 | Chandler et al. ........................ 346/108 |
| 4,734,715 | 3/1988 | Shiraishi .................................. 346/108 |
| 4,953,036 | 8/1990 | Yoshimura ............................... 358/400 |
| 5,198,919 | 3/1993 | Reeder ..................................... 359/203 |
| 5,239,313 | 8/1993 | Marko et al. ............................ 346/108 |
| 5,255,115 | 10/1993 | Kikuchi ................................... 359/209 |
| 5,274,492 | 12/1993 | Razzaghi ................................. 359/202 |
| 5,289,001 | 2/1994 | Rimoto et al. ......................... 250/201.2 |
| 5,557,438 | 9/1996 | Schwartz et al. ....................... 359/216 |

*Primary Examiner*—James Phan
*Attorney, Agent, or Firm*—Nelson Adrian Blish; David A. Novais

[57] ABSTRACT

A laser scanner (10) has a light source (12), which produces a light beam (32) which is incident on a polygon tower (14) comprised of a first polygon (30) having a first diameter and first number of facets, and a second polygon (20) having a second diameter and second number of facets. The polygon tower (14) rotates about an axis common to both the first (30) and second (20) polygon and the first polygon. The point at which the light beam is incident on the polygon tower is shifted in a direction approximately parallel to the axis of the polygon tower so that the incident light is directed at either the first polygon or the second polygon. In one embodiment a reflected light beam from one of the polygons is off center from an optical axis of a scan lens (16). Moving the point at which the light beam is incident on the polygon tower (14) from the first polygon (30) to the second polygon (20), changes the format size, and resolution without moving or refocusing the scan lens, and without moving the polygon tower (14) or the imaging medium.

25 Claims, 7 Drawing Sheets

DUAL FORMAT DUAL RESOLUTION SCANNER WITH OFF-AXIS BEAMS

CROSS REFERENCE TO RELATED APPLICATIONS

Reference is made to commonly assigned, co-pending U.S. patent application Ser. No. 08/771,367, [Attorney Docket No. 746201], titled DUAL FORMAT PRE-OBJECTIVE SCANNER, inventors Harrigan et al. filed on Dec. 16, 1996.

BACKGROUND OF THE INVENTION

1. Field of the Invention

This invention relates in general to scanners using multi-faceted rotating polygon deflectors and in particular to laser printers having the capability to print more than one image size and resolution.

2. Description of the Prior Art

In creating digital images on photosensitive media there are two applications with differing needs. The first application is for large format, high quality images with fine text and graphics in which the production speed is not critical. These images are up to approximately 12 inches in width and use pixel densities over 400 spots per inch. The second application is for smaller format images with minimal text of large font size, and high productivity. In these images, the width is about 5 inches or smaller and the spot density is below about 400 spots per inch. In order to minimize the floor space required by two machines, it is advantageous to use a single printer in which the format and pixel density can be switched easily between the two applications described. In addition, the printer should use a single paper path for both formats and the cost to manufacture such a printer should be lower than that of two separate machines.

The use of laser printers, especially for creating electrostatic images such as in a photocopier, is widely known. In these applications, a single format and single resolution are normally used. High quality laser printers commonly incorporate optical correction means for a defect in the manufacture of polygons called pyramid error, which is a tilt of the polygon facets in such a way that the facets do not form a vertical cylinder. In other words, the facet normals do not lie in the same plane, but can vary from facet to facet. Even small errors of this type cause extensive degradation of images because the error is periodic, recurring with each rotation of the polygon. This can lead to a defect in the image called banding. The human eye is very sensitive to banding errors and it would be desirable to eliminate this type of error.

One of the means for correction of polygon pyramid error is to make the facet conjugate to the image-forming medium. Conjugate means an image of the polygon facet is in focus at the medium. In U.S. Pat. No. 4,040,096 by Starkweather, this conjugation is provided by a cylindrical lens which has power only in the page scan section of the beam. U.S. Pat. No. 4,247,160 by Brueggemann discloses a laser polygon printer which has a positive cylindrical mirror disposed between a polygon and an image-forming medium. However, neither of these devices prints more than one image format.

Printing more than one image resolution with one printer has been done by using a scanner with a reflecting surface which varies in width in the scanning direction. See G. Starkweather in U.S. Pat. No. 3,944,323. Other methods of using more than one image resolution with one printer are shown in the following U.S. Pat. Nos.: 5,289,001; 5,274,492; 5,255,115; 5,239,313; 4,953,036; 4,734,715; 4,578,689. None of these patents disclose the use of multiple polygons and none use more than one scan length.

The use of more than one format is described in U.S. Pat. Nos. 4,651,170 and 4,651,169 by J. Chandler, D. Kessler, and E. Muka. In these patents, the format in the line scan direction, i.e. the scan length, is changed by adjusting the space between the polygon deflector and the image-forming medium. In order to maintain the beam focus on the medium in the scan section of the beam, the optics prior to the polygon deflector are modified. Also, the cylindrical mirror following the polygon is tilted and shifted in order to maintain the polygon mirror facet conjugate with the image-forming medium. The page scan format is changed via a speed change in the moving medium.

A co-pending application for a Dual Format Pre-objective Scanner, Ser. No. 08/771,367, [Attorney Docket No. 74,620], assigned to the same assignee as the present application, shows two different polygons with the same scan objective for scanning separate formats in different resolutions. In that invention, each polygon is shifted into position so that its facet at center of scan is at the same distance from the scan objective and so the deflected beam sweeps through a plane containing the optical axis of the scan objective. This polygon positioning method ensures that the optical conjugate relationship between the polygon facet and image-forming medium is maintained.

SUMMARY OF THE INVENTION

It is an object of the invention to provide a scanner capable of producing images with different formats and resolutions.

According to one aspect of the invention, the above and other objects are accomplished by a scanner having a light source, producing a beam of light which is incident on a polygon tower comprised of a first polygon having a first diameter and first number of facets, and a second polygon having a second diameter and second number of facets. The polygon tower rotates about an axis common to both the first and second polygon. The beam of light is reflected by the polygon tower through a scan lens. The point at which the light beam is incident on the polygon tower is shifted so that the light beam is directed at either the first polygon or the second polygon. In one embodiment a reflected beam of light is off-centered from an optical axis of a scan lens.

Moving the point at which the light beam is incident on the polygon tower from the first polygon to the second polygon, changes the size, format, and resolution without moving or refocusing the scan lens, and without moving the polygon tower or the imaging medium.

DISCLOSURE OF THE INVENTION

Figure 1:
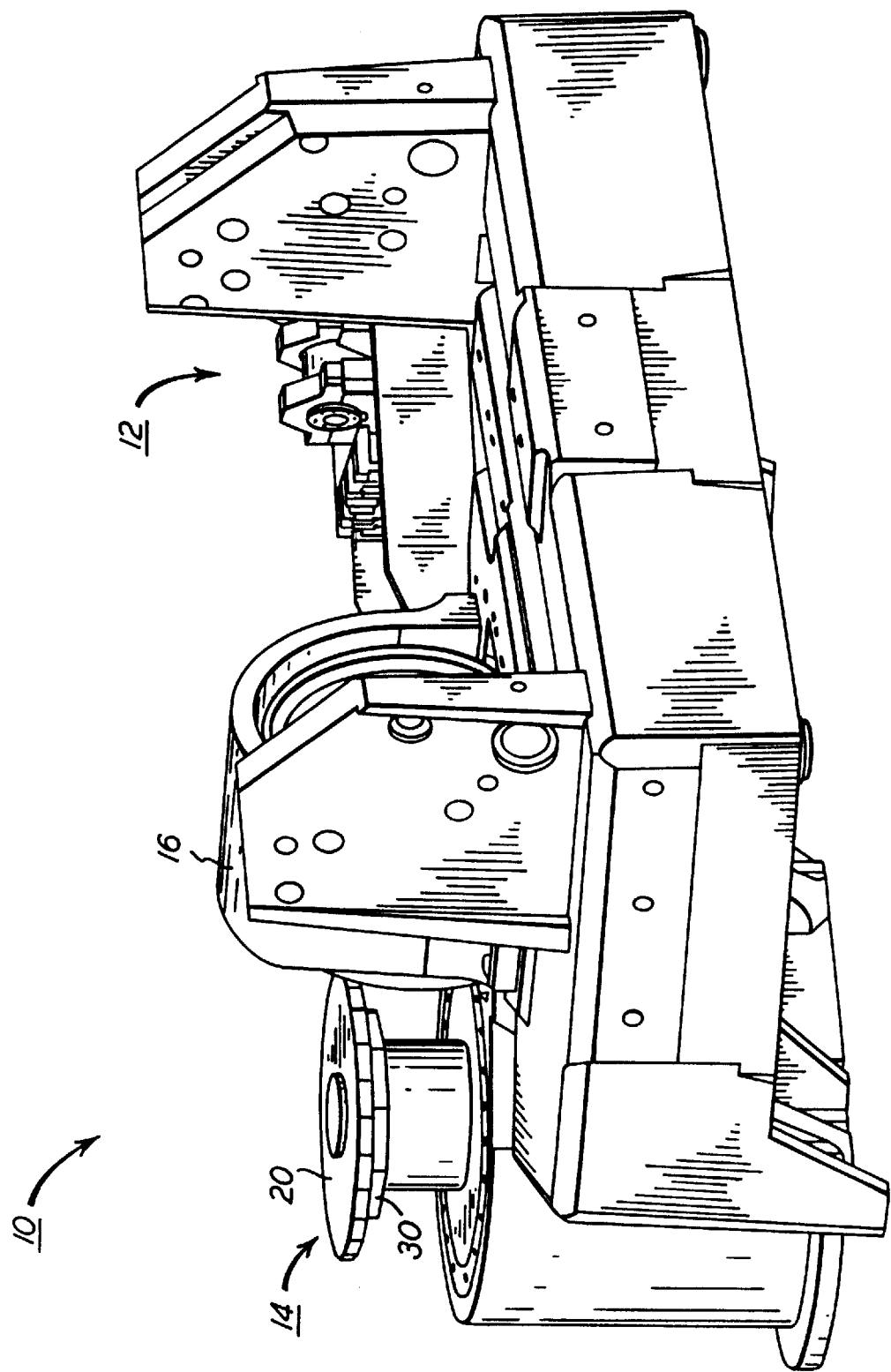
FIG. 1 is a perspective view of the optics for a laser thermal printer incorporating a multi-faceted dual polygon tower.
Figure 2:
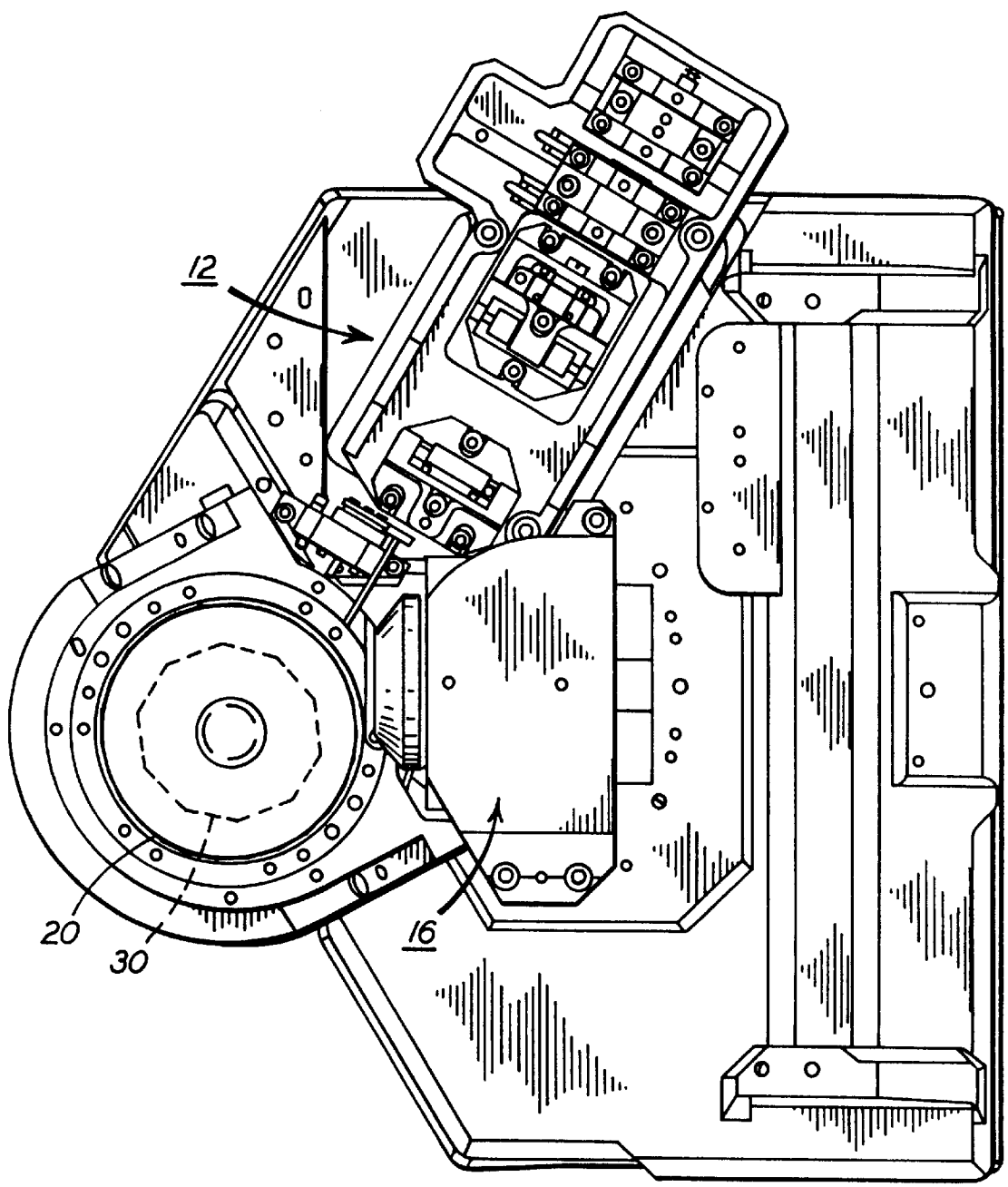
FIG. 2 is a top plan view of the optics for a laser thermal printer shown in FIG. 1.

FIGS. 1 and 2 show an example of the invention, but it should be understood that the invention is not restricted to the number of polygons shown, a particular number of facets per polygon, specific format sizes, or image resolutions. The dual format dual resolution scanner, referred to in general by numeral 10, is comprised of input optics 12, polygon tower 14 and scan lens 16. Input optics may include a variety of different light sources such as a single mode laser, for example a semi-conductor or gas type laser, and lenses for focusing and collimating the light from the light source. The scan lens 16 focuses the light from the polygon tower 14 onto an image medium, not shown.

The term "scan lens" is used to refer to an optical system placed between the polygon deflector and the image receiving medium. Scan lenses are well known in the art and provide at least some of the following functions: Focusing the deflected beams of light to form pixels of the desired size at the medium in both the scan direction and cross scan direction of the beams, making the polygon facet optically conjugate to the medium, and placing the centroid of the pixel at the medium in an "f-theta" (fθ) position in the scan section of the lens. The fθ position is a distance along the scan line from the center of scan which is equal to the product of the scan lens focal length in the scan direction of the lens, and the deflected beam angle with respect to the optical axis of the scan lens measured in radians as it enters the scan lens.

Figure 3:
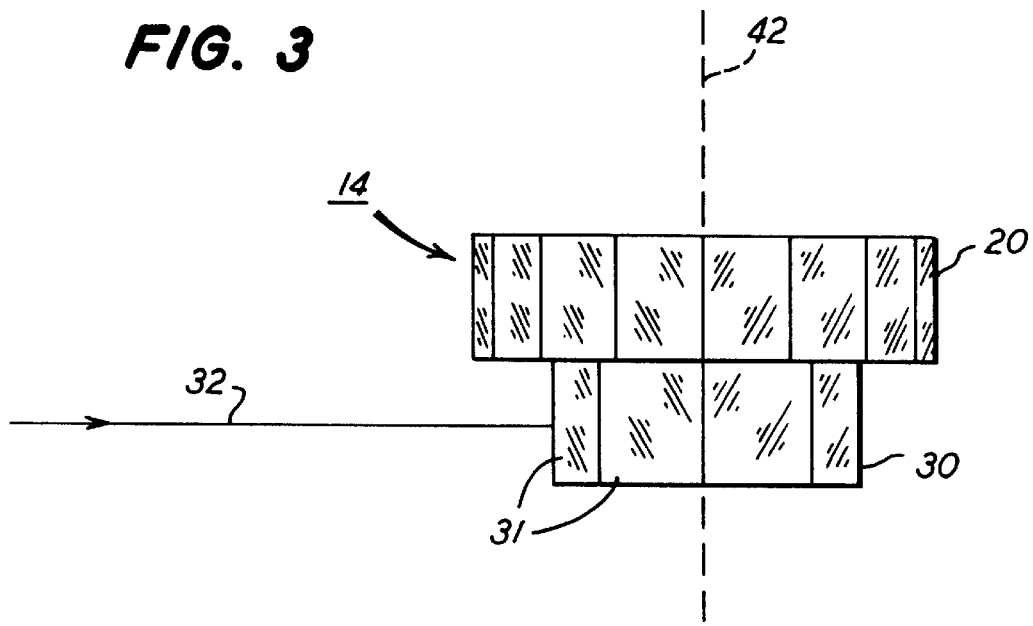
FIG. 3 is a schematic view of an incident light beam on an eight sided polygon.
Figure 4:
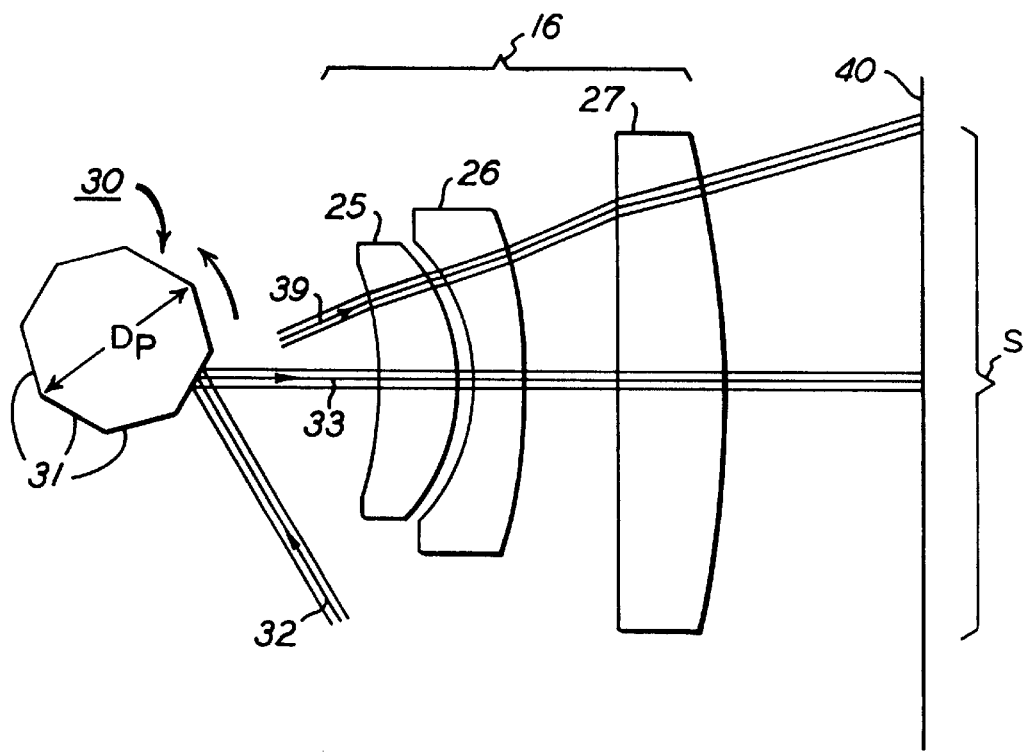
FIG. 4 is a schematic of an eight sided polygon deflecting an incident light beam through a scan lens.

The dual format pre-objective scanner, operates by projecting a beam of light from input optics 12 onto either sixteen sided polygon 20 or eight sided polygon 30, both of which are mounted on a common axis of rotation 42. FIGS. 3 and 4 show an eight sided polygon 30 deflecting an incident beam 32. The deflected beam 33 passes through the scan objective comprising lenses 25, 26 and 27, also known as an fθ lens, and is focused to a spot at the center of distant image-forming medium 40, when the incident beam hits a center of a facet. Deflected beam 39 is the path followed through the scan objective when the polygon has rotated counterclockwise by 12.4 degrees.

Figure 5:
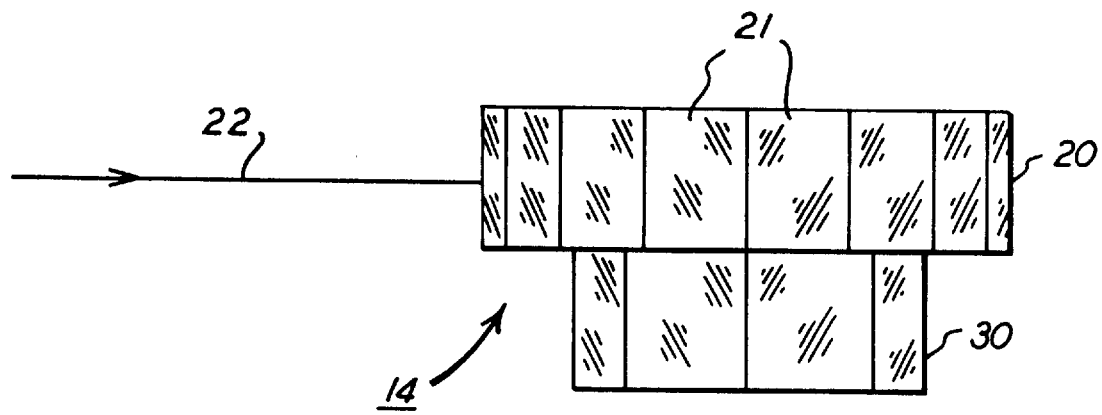
FIG. 5 is a schematic view of an incident light beam on a sixteen sided polygon.
Figure 6:
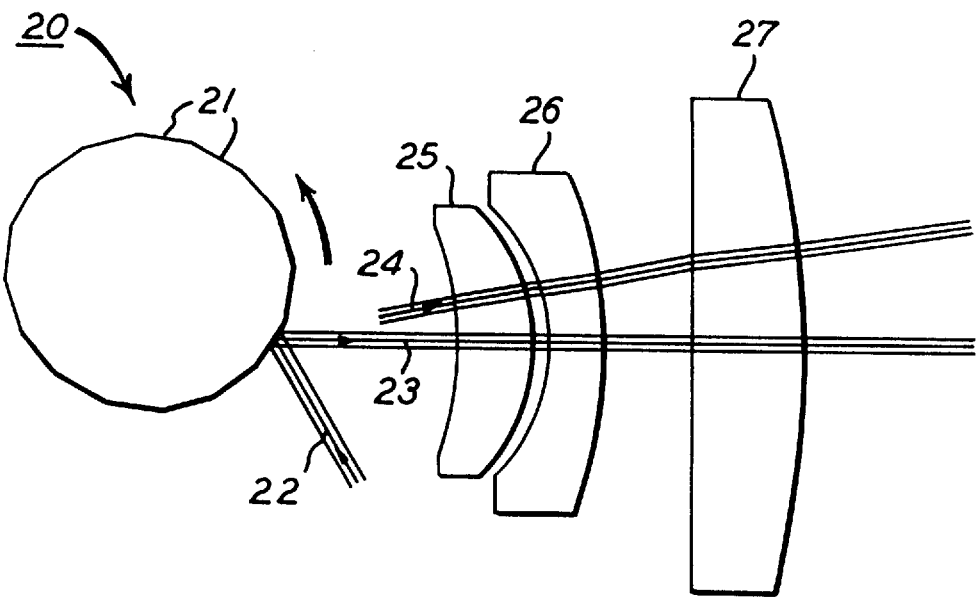
FIG. 6 is a schematic view of a sixteen sided polygon deflecting an incident beam through a scan lens.

FIGS. 5 and 6 show a sixteen sided polygon 20 deflecting an incident beam 22 of larger diameter along the same path through the same scan lens to a focused spot at the center of a distant image forming medium, not shown. Deflected beam 23 passes through scan lens on the path shown, and deflected beam 24 is the path followed through the scan objective when the polygon has rotated counterclockwise by 6.2 degrees.

The sixteen sided polygon 20 is used for forming pixels 0.169 millimeters in diameter measured at the $1/e^2$ diameter on the image-forming medium. The term $1/e^2$ is an intensity level measured from the peak intensity equal to 13½%. The image size scanned is 5 inches in length. The eight sided polygon 30 forms spots 0.128 millimeters in diameter at the $1/e^2$ diameter on the image forming medium. The image size scanned by the eight sided polygon 30 is 10 inches in length.

To solve the problem of using the same scan objective for more than one wavelength, image size, and resolution, it is necessary to consider carefully the selection of polygon sizes and number of facets. This is the normal starting point for a scanner design because the objective following the polygon is highly dependent on the polygon characteristics. The basic equation, Equation 1, provides for the minimum polygon size.

Equation 1:

$$D_p = \frac{\beta \lambda SN}{2\omega_0 \pi^2 \epsilon} \cdot \frac{1}{\cos\left(\frac{\theta_i}{2}\right) \sin\left(\frac{\pi}{N}(1-\epsilon)\right)}$$

$D_p$=diameter of the polygon measured across the corners (the diameter of a circle circumscribing the polygon, shown in FIG. 4)

S=length of the scan line, shown in FIG. 4)

λ=wavelength of light

ε=duty cycle (the fraction of the angle subtended by the polygon facet during which the active scan takes place)

N=total number of facets on the polygon $\omega_O$=½ diameter of the beam waist, in the scan direction, (at the $1/e^2$ intensity level) at the image-forming medium β=truncation factor by the polygon at the end of scan as it rotates through the incident beam (A value of 1 means the corner of the facet clips the input beam at its $1/e^2$ intensity level)

Figure 8:
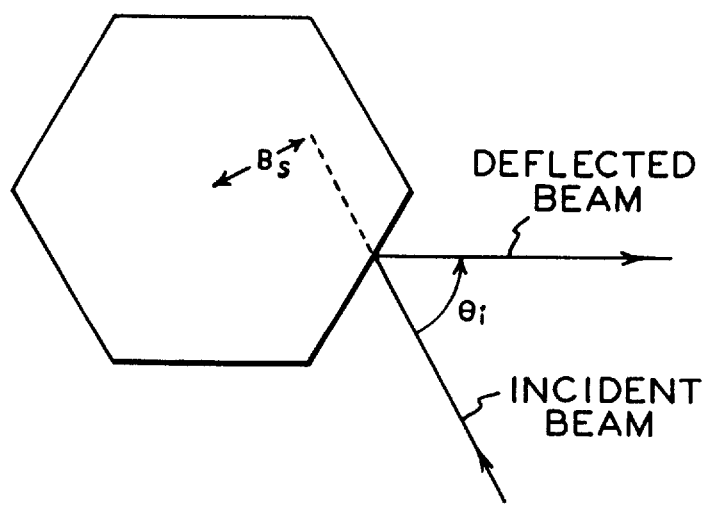
FIG. 8 is a top plan view of an eight sided polygon showing the incident beam offset.

$\theta_i$=total angle between the incident beam and the deflected beam at the center of scan (shown in FIG. 8)

The above equation is based on the assumption that the incident beam is incident on the polygon in such a way that the beam clipping by the facet at the end of scan is the same at each end of scan. Equation 2 defines the quantity $B_S$, a distance from the center of the polygon along a line perpendicular to the input beam. See FIGS. 7 and 8. The value of $B_S$ which provides the same clipping of the input beam at each end of scan is defined by Equation 2.

Equation 2:

$$B_s = \frac{1}{2} D_p \sin\frac{\theta_i}{2} \cdot \cos\left(\frac{1}{2}(\theta_p - \Phi)\right)$$

θ=angle subtended by a single polygon facet

Φ=total rotation of the polygon required to scan S

Figure 7:
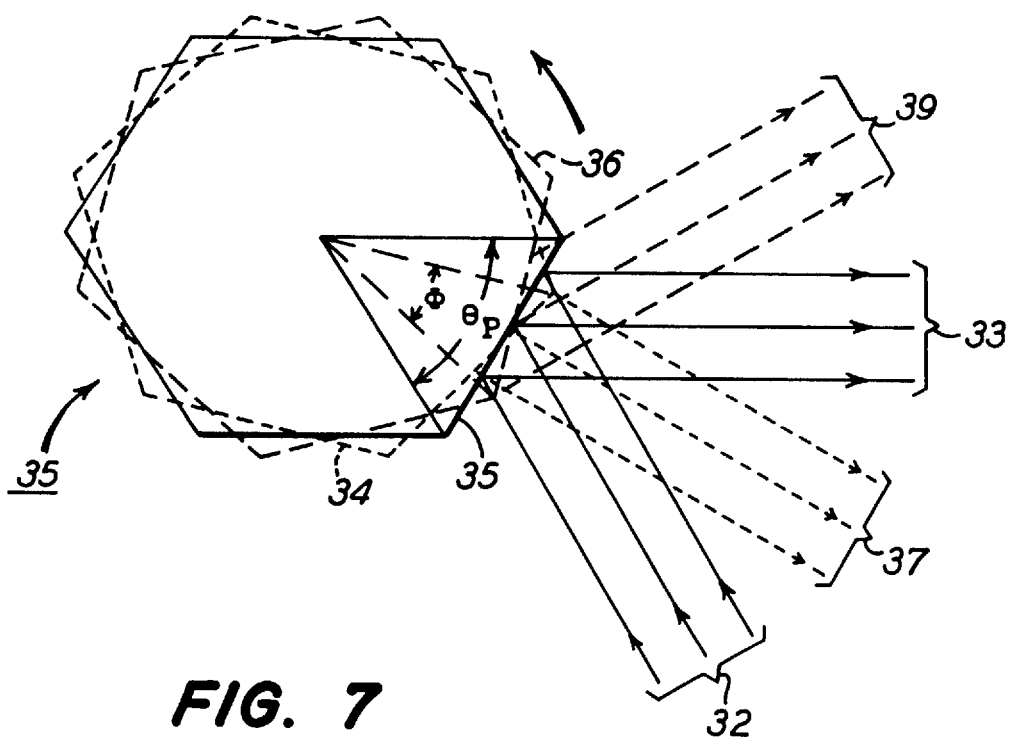
FIG. 7 is a top plan view of the eight sided polygon showing the beginning center, and end of scan.

For purposes of illustration, FIG. 7 shows six sided polygon 35 at the center of scan, at the beginning of scan in phantom 34, and at the end of scan in phantom 36. Incident beam 32 is deflected at the beginning of scan to a deflected beam 37, at center of scan to a deflected beam 33, and at the end of scan to a deflected beam 39.

At one end of the scan the polygon has rotated by Φ/2 and at the other end of the scan it has rotated by -Φ/2. The polygon rotates in a single direction starting a scan at -Φ/2 and ending the scan at Φ/2. Selecting a value for $B_S$ according to Equation 2 makes the distance from the polygon facet corner to the upper edge of the input beam at one end of scan equal to the distance from the other polygon facet corner to the lower edge of the input beam at the other end of scan.

The minimum diameter of each polygon is sensitive to the number of facets and duty cycle. Frequently the argument of the sine function in the denominator can be replaced by its argument in radians with only a small error. This error decreases as the number of facets increases. In fact the error is less than 3% when the number of facets is greater than or equal to eight. This results in the following simplified equation.

Equation 3:

$$D_p = \frac{\beta \lambda S N^2}{2\omega_0 \pi^3 \epsilon (1 - \epsilon)\cos\left(\frac{\theta_i}{2}\right)}$$

With all other parameters fixed, the polygon diameter grows as the number of facets squared. Also, the diameter is a minimum when the duty cycle, $\epsilon$, is at a value of 0.5 and it grows rapidly as the duty cycle moves away from 0.5.

The polygon diameter is proportional to the scan length and inversely proportional to the pixel size at the image. Therefore, a larger polygon is needed to scan a greater length and at a higher resolution. The two applications for digital images discussed above then would seem to have conflicting polygon size requirements. Namely, a larger format and higher resolution both work to increase the polygon diameter. So, it would seem difficult to use the same or nearly the same size polygon for both a large format high resolution application and a small format low resolution application. However, when the need for printing speed in both devices is considered, a high number of facets will scan a larger number of lines per revolution than a low number of facets. Each facet produces one line of a raster scan while the scan in the perpendicular direction, referred to as the page scan direction, is usually accomplished by motion of the image medium. For example, a cylindrical drum to which the image medium is attached moves the image medium in the page scan direction.

The number of facets then can compensate for the scan length and resolution change and it does so in a desirable fashion for the two applications of interest. Namely, using a high number of facets for the low resolution small format printer compensates for the smaller size needed for this case in such a way that the polygons are nearly the same size. The idea is to keep the quantity $SN^2/\omega_O$ approximately constant for the two formats. The incidence angle would then be identical for both cases and the duty cycle and clip ratio would not be too different allowing the polygon for each format to be approximately the same size.

An additional step is to use the same objective after the polygon for forming the pixels of both cases. For a so called "f$\theta$" lens, the scan length or image height is proportional to the chief ray angle entering the lens. In fact, the f$\theta$ lens has the property that:

$$\frac{1}{2}S = f\theta_s$$

In this equation, S is the total scan length defined above, f is the focal length of the scan lens, and $\theta_s$ is one half the total optical scan angle in radians. Because a polygon mirror doubles the angle upon reflection, $\theta_s = \Phi$, the total mechanical rotation of the polygon through one facet. So, by the definition of the duty cycle, $\epsilon$:

$$\Phi = \epsilon \frac{2\pi}{N}$$

Where, the angle subtended by a facet is $2\pi/N$ radians, the maximum angle through which a polygon facet can rotate. If these two equations are used to solve for the focal length, the result is:

$$f = \frac{NS}{4\pi\epsilon}$$

To use the same objective for multiple format scans, it is necessary then to keep the quantity $NS/4\pi\epsilon$ the same for both scanners.

The number of facets squared in terms of the format size, duty cycle and scan lens focal length in the scan direction is:

$$N^2 = \frac{16\pi^2 \epsilon^2 f^2}{S^2}$$

With this substituted into the polygon diameter equation:

$$D_p = \frac{8\beta\lambda\epsilon f^2}{\omega_0 \pi (1 - \epsilon)\cos\left(\frac{1}{2}\theta_i\right) S}$$

This equation can be used to show the implications of using the same focal length f for different scans and resolutions. For the two different formats, we assume the incidence angle, wavelength, and focal length are the same and use subscripts 1 and 2 for the values of each format.

$$D_1 = \frac{8\beta_1 \lambda \epsilon_1 f^2}{\omega_{01} \pi (1 - \epsilon_1)\cos\left(\frac{1}{2}\theta_i\right) S_1}$$

$$D_2 = \frac{8\beta_2 \lambda \epsilon_2 f^2}{\omega_{02} \pi (1 - \epsilon_2)\cos\left(\frac{1}{2}\theta_i\right) S_2}$$

Putting all the same quantities on the right hand side of each equation:

$$\frac{D_1 \omega_{01}(1 - \epsilon_1) S_1}{\beta_1 \epsilon_1} = \frac{8\lambda f^2}{\pi \cos\left(\frac{1}{2}\theta_i\right)} = \frac{D_2 \omega_{02}(1 - \epsilon_2) S_2}{\beta_2 \epsilon_2}$$

This equation can be rewritten:

$$D_1 = D_2 \frac{\beta_1}{\beta_2} \frac{\omega_{02}}{\omega_{01}} \frac{(1 - \epsilon_2)}{(1 - \epsilon_1)} \frac{\epsilon_1}{\epsilon_2} \frac{S_2}{S_1}$$

This relates the minimum size polygon for one format and resolution to that of a second format and resolution. Different duty cycles and clip ratios are allowed for each scanner. Ordinarily, the pixels sizes and formats are determined and there is very little flexibility in the quantity $\omega_{02}/\omega_{01}$ $S_2/S_1$. If one tries to use different duty cycles, a severe penalty occurs in the minimum size polygon requirement for the other format. One can find the results in the table below by substituting some numbers.

| $\epsilon_1$ | $\epsilon_2$ | % change in polygon diameter |
|---|---|---|
| .4 | .38 | 8.77 |
| .5 | .48 | 8.33 |
| .6 | .58 | 8.62 |
| .7 | .68 | 9.80 |

This shows that the second polygon minimum size grows about 9% when it is used at a duty cycle only 0.02 different than the first. It can also be seen that the minimum percent change occurs when the first polygon is used at a 50% duty cycle.

Since the minimum polygon size is proportional to the number of facets squared, it is preferred to choose the size of the polygon for the high speed application first. This polygon is likely to be larger even with the lower demand of format size and pixel size if the speed requirement is dominant.

If the duty cycle $\epsilon$ is the same for both polygons, then since the quantity $NS/4\pi\epsilon$ must be constant in order to use the identical focal length objective, it is necessary that the product NS have the same value for both formats. This is the explanation for the fact that the sixteen sided polygon 20 scans five inches while the eight sided polygon 30 scans 10 inches.

Another possibility is to use the same polygon for the smaller format that is used for the large format, and adjust the duty cycle factor so that:

$$\frac{S_1}{\epsilon_1} = \frac{S_2}{\epsilon_2}$$

With this method, the laser would be turned on only during the central five inch part of the 10 inch scan, but this would make inefficient use of the high performance data processing electronics and laser power. Not only would productivity suffer because of the smaller number of lines scanned per polygon rotation, but only a small part of the potential scan of each facet would be used, therefore, this is not a desirable technique.

To choose the clip factor, $\beta$, one needs to consider pixel size growth from clipping in conjunction with pixel growth due to lack of a completely flat image field. The pixel growth due to astigmatism and field curvature across the scan may be large enough that very little pixel growth due to clipping may be permitted. This means that the clipping factor may have to be larger than one in order to reduce pixel growth from clipping at the end of scan. Fortunately, the small format polygon will naturally have a smaller scan angle due to the larger number of facets, so the field angle seen by the scan lens will be reduced with a consequent reduction in field curvature and astigmatism. If the pixel size growth requirements are not so stringent for this format, it may be possible to use a $\beta$ factor less than one which would make the spot grow more at the ends of scan. The advantage of a $\beta$ factor less than one is the reduced size of the polygon given by a smaller $\beta$.

For the large format polygon with its larger scan angle, the astigmatism and field curvature will likely have a major impact on pixel growth across the scan. It may be large enough that the pixel growth caused by clipping must be minimized. The large format polygon is generally smaller in diameter than the polygon used for producing small format images, since it has a smaller number of facets. There could be enough leeway to use a polygon larger than the minimum to reduce pixel growth from clipping. The large format polygon can have a $\beta$ larger than one and still not have an adverse affect on the polygon size.

To simplify mechanical changes between formats, both input beams are incident at the same angle to the facet at zero scan angle (center of scan) so that the angles between the input beam and deflected beam remain at $\theta_i$. It is still necessary to change the diameter of the input beam to adjust the resolution or pixel size at the image medium. With no change in the scan lens the most direct way to affect the pixel size is to change the beam diameter incident on the polygon. This is accomplished by changing the diameter of the incident beam at the input optics prior to the polygon for each resolution.

It will be important to keep the polygon facet in a conjugate relationship with the image medium in the page scan section of the optical system to avoid banding. One way this can be achieved by shifting each polygon into place in such a way that the distance, measured along the scan optical axis, from the facet at the center of scan to the first component of the f$\theta$ or object lens is substantially the same. A disadvantage of this method is that it requires precision positioning of each polygon or alternatively the image receiving medium and both methods are expensive. To avoid the cost and inconvenience of positioning either the polygons or image receiving medium, it is desirable to have each polygon mounted to the same shaft of the same motor and kept in a fixed relationship with respect to the scan objective. This allows the image receiving medium and its associated cross-scan mechanical system to be kept in the same location when the formats are changed, a significant advantage.

Figure 9:
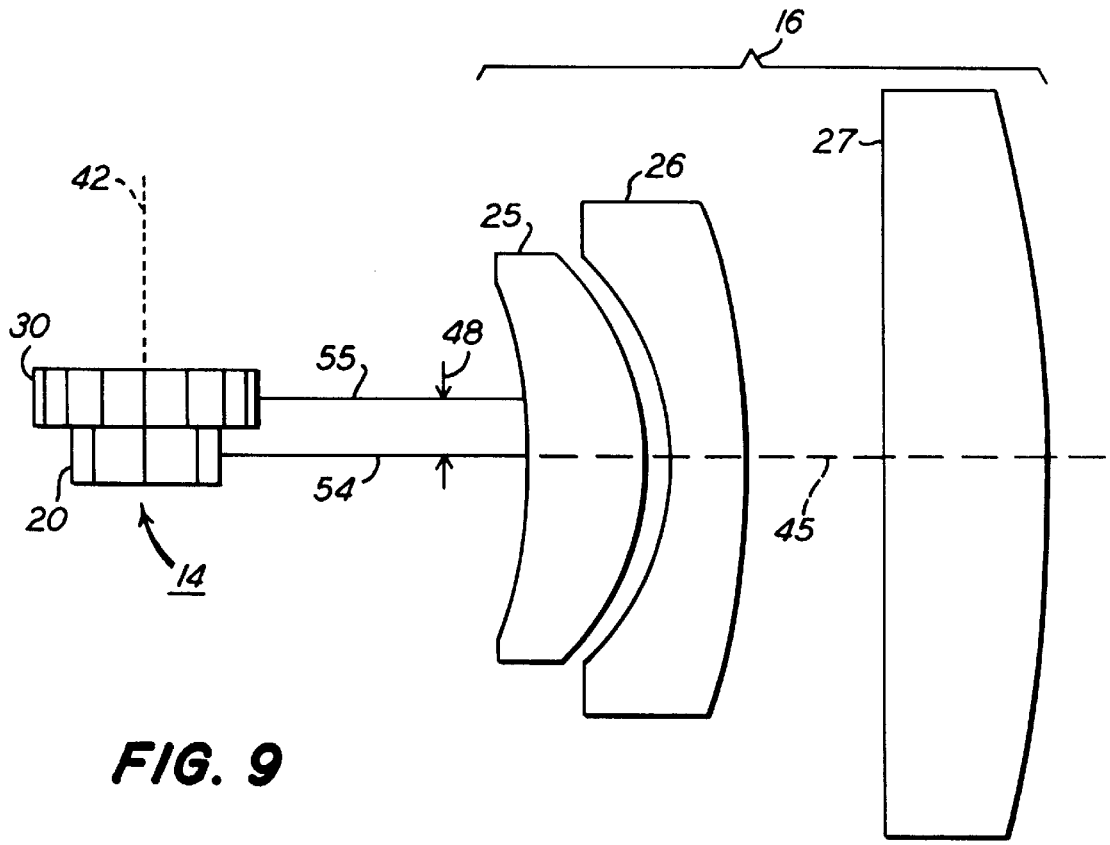
FIG. 9 is a schematic view from the side of the polygon tower and the scan lens.

In order to use this technique, at least one of the deflected beams would enter the scan lens in a plane not containing the optical axis of the scan lens due to the height of the polygon tower. FIG. 9 is a polygon scan system according to the present invention using the same scan lens for scanning two or more format sizes at different resolutions. To create different format sizes at different resolutions, an incident laser beam is shifted so that it strikes the polygon giving the desired format and resolution. To accomplish this it is necessary to scan the imaging medium with a deflected light beam from one of the polygons off the axis of the scan lens, while maintaining an optical conjugate relationship between the polygon facet and the image-forming medium. The polygons spin on a common rotational axis 42, use the same incident beam geometry for both polygons, and minimize pixel growth across the scan line.

FIG. 9 shows a side view of polygon tower 14 with incident laser beam deflected from polygon 20 along beam 54. The deflected beam 54 passes through the scan lens 16 consisting of lenses 25, 26, and 27, and is focused to a pixel on at the center of a distant image forming medium, not shown. Polygon 30, a sixteen sided polygon shows deflected laser beam 55 passing through the same scan lens to focus a pixel on the image-forming medium. Deflected beam 54 lies in a plane containing the optical axis 45 of the scan lens. Deflected beam 55 is parallel to deflected beam 54, but does not lie in a plane containing the optical axis and is separated from the optical axis by vertical shift 48.

The invention relates to having the polygon assembly and scan objective in a fixed spatial relationship with respect to each other. In one format, the incident beam is incident in the same plane as the deflected beam. To use the other polygon to create an image in a second format and resolution, the optical system prior to the polygon is modified to change the incident beam diameter and shifted the incident beam vertically so that it strikes the second polygon. One way to achieve this is to simply remove the optical system prior to the polygon and put in place another optical system which produces the desired beam size and position.

Figure 10:
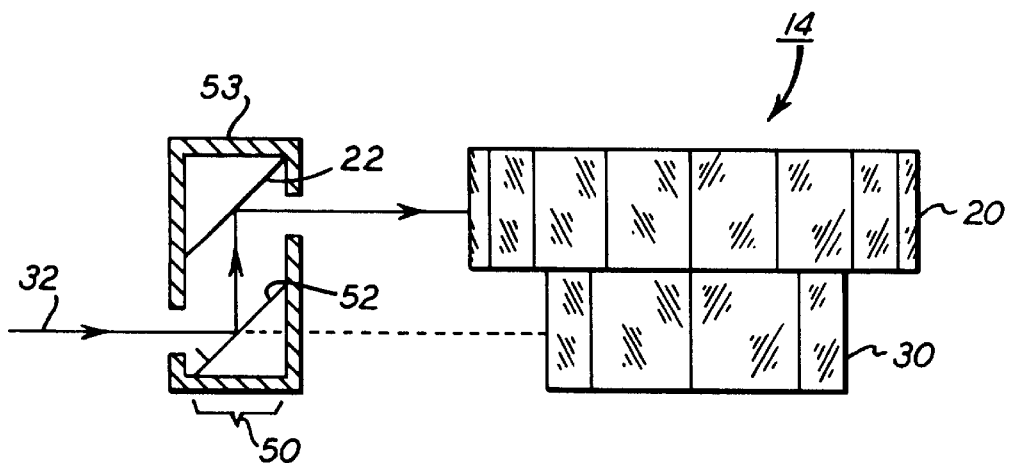
FIG. 10 is a schematic view of the polygon tower with the incident beam deflected by a periscope.

Another way to achieve this is to change the optical system prior to the polygons. With this method, the original laser beam starts along the same optical axis, but passes through an additional series of lenses and mirrors which has been shifted into position with a pair of mirrors, 52 and 53, tilted at 45 degrees, forming a periscope 50 to shift the incident beam. In FIG. 10, a polygon tower 14 is shown with incident beam 32 deflected away from the lower polygon 30. The incident beam is deflected by a periscope 50 comprised of a pair of mirrors 52 and 53 tilted at 45 degrees to strike upper polygon 20. The periscope 50 is moved into position by mechanical or electrical means, not shown.

Scanning with a deflected beam off the optical axis presents a number of problems. First, the beam exiting the scan lens no longer scans in a plane, which causes the scan lens to follow a curved trajectory on the image-forming medium. Second, the cross-scan and scan section foci shift and this causes a different astigmatic relation than that obtained when the beam is scanned in a plane containing the optical axis. Third, the optical conjugate relationship between the polygon facet and the image-forming medium is upset which can lead to unacceptable image artifacts. Fourth, the beam becomes off axis in the scan direction also unless the incident beam geometry is changed. Fifth, the incident beam on the scan lens off the optical axis will have its focus position shifted in a transverse direction on the image-forming side in addition to the foci shifts discussed above. Sixth, the beam offset, $B_S$, can only be optimized for one of the polygons since the other polygon's position is constrained to have the same rotation axis as the first.

The first problem, the curved scan trajectory is minimized by having the polygon with the smallest optical scan angle produce the off-axis scan beam. The maximum amount of "bow" or cross-scan error in the scan arc increases with larger scan angles. Using the off-axis beam with smallest optical scan angle may reduce the scan arc to an acceptable level.

The second problem having a different amount of astigmatism for the off-axis beam may cause the pixel sizes to increase by an unacceptable amount. In this case, the optical system prior to the polygon is modified to introduce an amount of astigmatism which compensates for the change brought about by the off axis beam. This is done by using curved cylindrical mirrors 52 and 53 for the periscope 50 which directs the input beam to the second polygon. The curvatures of these mirrors can be adjusted independently for both the scan and cross-scan foci of the beam. The surface of mirror 52 may be curved, or the surface of mirror 53 may be curved, or the surfaces of both mirrors may be curved. If one mirror is compensated in a cross scan direction, the other mirror may be compensated in the scan direction. If the astigmatism is not severe, it may not be necessary to compensate for it.

The third problem is the change in optical conjucacy between the facet and medium caused by the beam being off the optical axis. Generally, an optical system has curvature of field so that off-axis images may focus closer or farther from the lens than images on the optical axis. Field curvature is normally undesirable, but this aberration can be used to advantage in this case if the scan lens has the right amount of field curvature. For example, suppose the polygon facet is imaged closer to the scan lens when the off-axis scan beam is used because the scan lens has field curvature. If the facet is then moved closer to the scan lens by the right amount, the facet can be imaged back on the medium so that the pyramid error of the facets is still compensated. To accomplish this, the polygon for the off-axis scan is increased in size above the minimum given in Equation 3, so that the facet is positioned at the conjugate point of the medium.

Figure 11:
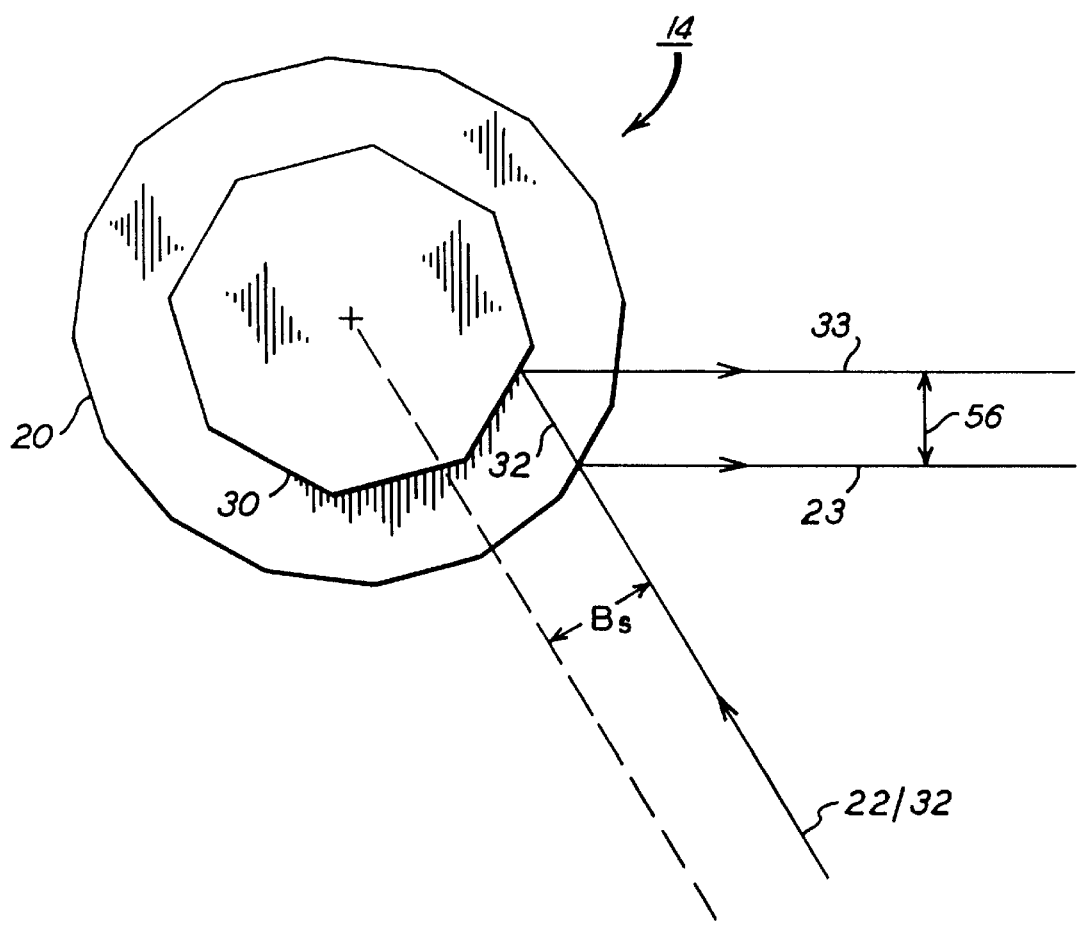
FIG. 11 is a top plan view of the polygon tower.

FIG. 11 illustrates the fourth problem, an off-axis shift of the deflected beam in the scan direction. This off-axis shift also changes the astigmatism and this must be taken into account in the design of the pre-polygon optics. FIG. 11 illustrates an off-axis beam shift in the scan direction. The incident beam 22 is deflected off the large, sixteen sided polygon 20 along ray 23 and then enters the scan lens. The incident beam 32 is deflected off the small, eight sided polygon 30 along ray 33 and then enters the scan lens. There is a displacement 56 between the deflected beams in the scan direction.

The fifth problem, a transverse shift along the scan line as a result of the beam being off-axis in the scan direction at the polygon is handled when the scan timing starts. It has the effect of shifting the whole image across the page in the scan direction.

The sixth problem, a non-optimal $B_S$ for one of the polygons, will now be discussed. FIG. 11 illustrates this problem also as can be seen with by the way the incident beam strikes polygon 30 high on the facet at center of scan. Optimally, each polygon should be positioned so that each has an optimal value of $B_S$ for equalizing the pixel growth due to clipping, given in Equation 2. This is not possible when using two polygons on the same axis of rotation because only one of the polygons can have the beam incident at the optimum value of $B_S$ since the second polygon position is fixed with respect to the first polygon and the incident beam. In order to have an optimum value of $B_S$ for each polygon, it would be necessary to move the incident beam for one of the polygons. This problem is minimized by choosing the optimum value of $B_S$ for that polygon which most heavily clips the incident beam at end of scan. In the preferred embodiment, $B_S$ is optimized for the sixteen-sided polygon.

The invention has been described in detail with particular reference to preferred embodiments thereof, but it will be understood that variations and modifications can be made within the spirit and scope of the invention as set forth in the claims. For example, the polygon tower could be comprised of more than two polygons mounted on a common axis of rotation. Three or more polygons could be mounted on a common axis of rotation 42 to provide multiple formats for laser printing. Also, even though the invention is incorporated in a laser printer as described, the invention could be used in any scanning application.

It is to be understood that the scan lens could consist of as few as one element or more than three as shown in FIG. 4, and that the elements could be of different shape than shown. Also, it is to be understood that the invention applies to any multi-faceted polygon and that the order of polygons could be reversed, namely the larger diameter polygon could deflect the incident beam in a plane containing the optical axis.

Yet an additional modification that falls within the scope of the claims of the present invention relates to the number of facets on each polygon. There may be any number of facets for the first polygon or the second polygon even though the specific example shown is eight facets for the smaller polygon and sixteen facets for the larger polygon. Also, the polygon with the smaller diameter need not have the least facets.

In a further modification, prisms could be used in the periscope in place of mirrors. Also, the optical element comprising the periscope need not be contained in a cylinder as shown.

| Parts List |
| --- |
| 10 Pre-objective scanner |
| 12 Input optics |
| 14 Polygon tower |
| 16 Scan Lens |
| 20 Sixteen sided polygon |
| 21 Facet |
| 22 Incident beam |
| 23 Deflected beam |
| 24 Deflected beam |
| 25 Lens |

Parts List

| | |
|---|---|
| 26 | Lens |
| 27 | Lens |
| 28 | Center of Facet |
| 30 | Eight sided polygon |
| 31 | Facet |
| 32 | Incident beam |
| 33 | Deflected beam |
| 34 | Polygon at beginning of scan |
| 35 | Polygon at center of scan |
| 36 | Polygon at end of scan |
| 37 | Deflected beam |
| 38 | Center of Facet |
| 39 | Deflected beam |
| 40 | Image-forming Medium |
| 42 | Axis of rotation |
| 45 | Optical Axis |
| 48 | Vertical Shift |
| 50 | Periscope |
| 52 | Mirrors |
| 56 | Displacement |

We claim:

1. A dual format dual resolution scanner comprising:
a polygon tower comprised of a first polygon having a first diameter and a first number of facets and a second polygon having a second diameter and a second number of facets, said polygon tower mounted for rotation on an axis common to said first polygon and second polygon;
a light source producing a beam of light;
a periscope between said light source and said polygon tower which shifts a point of contact of said beam of light between said first polygon and said second polygon; and
a scan lens for receiving said beam of light deflected from said polygon tower.

2. A dual format dual resolution scanner as in claim 1 wherein said second polygon has a second optical scan angle which is less than a first optical scan angle for said first polygon.

3. A dual format dual resolution scanner as in claim 2 wherein a reflected beam from said second polygon is off-centered from an optical axis of said scan lens.

4. A dual format dual resolution scanner as in claim 3 wherein said second diameter is chosen to maintain an optical conjugate relationship between each of said second facets and an image-forming medium.

5. A dual format dual resolution scanner as in claim 3 wherein said second diameter is greater than a minimum diameter, in order to maintain an optical conjugate relationship between each of said second facets and an image-forming medium.

6. A dual format dual resolution scanner as in claim 1 wherein said periscope is comprised of a pair of plane mirrors.

7. A dual format dual resolution scanner as in claim 1 wherein said periscope is comprised of a least two mirrors wherein a surface of at least one of said mirrors is curved.

8. A dual format dual resolution scanner as in claim 1 wherein an input beam offset $B_S$ is set to an optimal value for said first polygon wherein:

$$B_s = \frac{1}{2} D_p \sin\frac{\theta_i}{2} \cdot \cos\left(\frac{1}{2}(\theta_p - \Phi)\right)$$

wherein:
$D_p$=diameter of one of said polygons measured across the corners (the diameter of a circle circumscribing said polygon)
$\theta_i$=total angle between said beam of light and the deflected beam at the center of scan
$\theta_p$=angle subtended by a single polygon facet
$\Phi$=total rotation of said polygon required a scan line by one facet
for at least one of said dual formats.

9. A multiple format laser printer comprising:
a polygon tower mounted for rotation about an axis wherein said polygon tower has at least:
a first polygon having a first number of facets; and
a second polygon having a second number of facets, wherein said axis is common to both said first polygon said second polygon;
a light source which produces a beam of light;
a periscope between said light source and said polygon tower which shifts a point of contact of said beam of light between said first polygon and said second polygon; and
a scan lens which focuses said beam of light after deflection from one of said polygons to a pixel on an image-forming medium.

10. A multiple format laser printer as in claim 9 wherein said first number of facets is less than said second number of facets.

11. A multiple format laser printer as in claim 10 wherein said first number of facets is equal eight and said second number of facets is equal sixteen.

12. A multiple format laser printer as in claim 9 wherein a first diameter of said first polygon is less than a second diameter of said second polygon.

13. A multiple format laser printer as in claim 9 wherein said second polygon has a smaller optical scan angle than said first polygon.

14. A multiple format laser printer as in claim 13 wherein said deflected beam from said second polygon is off-centered from an optical axis of said scan lens.

15. A multiple format laser printer scanner as in claim 14 wherein a diameter of said second polygon is chosen to maintain an optical conjugate relationship between each of said second facets and said image-forming medium.

16. A multiple format laser printer scanner as in claim 9 wherein said periscope is comprised of a pair of plain mirrors.

17. A multiple format laser printer scanner as in claim 9 wherein said periscope is comprised of a least two mirrors wherein a surface of at least one of said mirrors is curved.

18. A multiple format laser printer scanner as in claim 9 wherein an input beam offset $B_S$ for said first polygon is set to an optimal value given by:

$$B_s = \frac{1}{2} D_p \sin\frac{\theta_i}{2} \cdot \cos\left(\frac{1}{2}(\theta_p - \Phi)\right)$$

wherein:
$D_p$=diameter of one of said polygons measured across the corners (the diameter of a circle circumscribing said polygon)
$\theta_i$=total angle between said beam of light and the deflected beam at the center of scan
$\theta_p$=angle subtended by a single polygon facet
$\Phi$=total rotation of said polygon required to scan S
for at least one of said multiple formats.

19. A multiple format, multiple resolution laser printer comprising:
a plurality of polygons each polygon having multiple facets, said polygons being mounted for rotation on a common axis;

a light source producing a beam of light;

reflective means located between said light source and said plurality of polygons which shifts a point of contact of said beam of light between a first polygon of said plurality of polygons and a second polygon of said plurality of polygons; and a scan lens which focuses said beam of light after deflection from at least one of said plurality of polygons, on an image-forming medium.

20. A multiple format, multiple resolution laser printer comprising:

a plurality of polygons each polygon having multiple facets;

a light source producing a beam of light;

beam shifting means located between said light source and said polygons, wherein said means shifts a point of contact of said beam of light between said polygons; and a scan lens for receiving a reflected beam of light from at least one of said polygons.

21. A multiple format, multiple resolution laser printer as in claim 20 wherein said reflected beam of light from at least one of said polygons is located on an optical axis of said scan lens.

22. A multiple format, multiple resolution laser printer as in claim 20 wherein said reflected beam of light from said at least one of said plurality of polygons is located off-centered from an optical axis of said scan lens, and said at least one of said plurality of polygons has an optical scan angle which is less than an optical scan angle of the other ones of said plurality of polygons.

23. A multiple format, multiple resolution laser printer as in claim 20 wherein said beam shifting means is a pair of plane mirrors.

24. A multiple format, multiple resolution laser printer as in claim 20 wherein said beam shifting means is comprised of at least one cylindrical curved mirror.

25. A multiple format, multiple resolution laser printer as in claim 24 wherein said mirror has curvatures adjusted to compensate for astigmatism in the off-axis scanning beam.

\* \* \* \* \*